(12) United States Patent
Millasseau (10) Patent No.: US 9,365,145 B2
(45) Date of Patent: Jun. 14, 2016

(54) CHILD CAR SEAT FOOT REST DEVICE

(71) Applicant: Isabelle Millasseau, Dubai (AE)

(72) Inventor: Isabelle Millasseau, Dubai (AE)

( * ) Notice: Subject to any disclaimer, the term of this patent is extended or adjusted under 35 U.S.C. 154(b) by 0 days.

(21) Appl. No.: 14/403,214

(22) PCT Filed: May 23, 2013

(86) PCT No.: PCT/FR2013/051124
§ 371 (c)(1),
(2) Date: Dec. 29, 2014

(87) PCT Pub. No.: WO2013/175131
PCT Pub. Date: Nov. 28, 2013

(65) Prior Publication Data
US 2015/0137575 A1   May 21, 2015

(30) Foreign Application Priority Data

May 24, 2012   (FR) ..................... 12 54775

(51) Int. Cl.
*A47C 7/50*   (2006.01)
*B60N 3/06*   (2006.01)
*B60N 2/28*   (2006.01)
(Continued)

(52) U.S. Cl.
CPC .. *B60N 3/06* (2013.01); *B60N 2/28* (2013.01); *B60N 2/286* (2013.01); *B60N 2/2824* (2013.01); *B60N 3/063* (2013.01); *A47C 7/50* (2013.01); *A47C 7/503* (2013.01); *A47C 7/506* (2013.01);
(Continued)

(58) Field of Classification Search
CPC .......... A47D 11/02; A47C 7/50; A47C 7/503;
A47C 7/506; A47C 7/52; B60N 3/063;
B60N 2/2824; B60N 3/06; B60N 2/28;
B60N 3/066; B60N 2/4495
USPC ................. 297/423.4, 423.38, 423.1, 423.39,
297/250.1, 256.16, 423.25, 423.27
See application file for complete search history.

(56) References Cited

U.S. PATENT DOCUMENTS 1,380,678 A   6/1921 Abraham
2,890,740 A * 6/1959 Larson ................... B60N 2/283
297/254

(Continued)

FOREIGN PATENT DOCUMENTS

FR   2 185 188   12/1973
FR   2 957 564   9/2011

OTHER PUBLICATIONS

International Search Report dated Sep. 27, 2013, corresponding to PCT/FR2013/051124.

*Primary Examiner* — Chi Q Nguyen
(74) *Attorney, Agent, or Firm* — Young & Thompson (57) ABSTRACT

A foot rest device for a child installed in a child car seat fixed to a seat or bench of a vehicle passenger compartment, includes an upright to be installed in a vertical median plane of the child car seat, a rotation-proof bar and a foot rest bar each transverse to the upright, elements for securing the device to the child car seat, and the upright having at its bottom end a foot for resting on the floor of the passenger compartment, the rotation-proof and foot rest bars being fixed in their middles substantially at right angles to the upright so that each forms two lateral parts symmetrical about the median plane, and the rotation-proof and foot rest bars being in vertical planes offset from one another, the rotation-proof bar being set back from the foot rest bar when the device is installed, with reference to a forward travel direction.

13 Claims, 3 Drawing Sheets

(51) Int. Cl.
*B60N 2/44* (2006.01)
*A47C 7/52* (2006.01)

(52) U.S. Cl.
CPC .............. *A47C 7/52* (2013.01); *B60N 2/4495* (2013.01); *B60N 3/066* (2013.01)

(56) References Cited

U.S. PATENT DOCUMENTS

| | | | | |
|---|---|---|---|---|
| 3,294,440 A * | 12/1966 | Broder | ............ | A47C 3/34 248/188.5 |
| 3,515,431 A | 6/1970 | Grady | | |
| 4,626,030 A * | 12/1986 | Kassai | ............ | B62B 9/10 280/47.4 |
| 4,874,203 A * | 10/1989 | Henley | ............ | A61G 5/00 297/250.1 |
| 5,111,909 A * | 5/1992 | Liu | ............ | B60R 3/007 182/150 |
| 6,860,557 B2 * | 3/2005 | Jonasson | ............ | B60N 3/063 297/219.12 |
| 7,464,990 B2 * | 12/2008 | Collias | ............ | B60N 2/2806 297/256.16 |
| 7,568,758 B2 * | 8/2009 | Troutman | ............ | A47D 1/002 297/148 |
| 7,967,387 B2 * | 6/2011 | Langhorn | ............ | A47D 11/02 297/423.25 |
| 8,757,723 B1 * | 6/2014 | Faust | ............ | A47C 31/11 297/423.39 |
| 9,089,219 B2 * | 7/2015 | Lee | ............ | A47C 7/52 |
| 2004/0036331 A1 * | 2/2004 | Jonasson | ............ | B60N 3/063 297/250.1 |
| 2006/0012234 A1 | 1/2006 | Collias | | |
| 2006/0012243 A1 | 1/2006 | Brancolini | | |
| 2008/0315647 A1 * | 12/2008 | Carine | ............ | B60N 2/2824 297/250.1 |
| 2009/0224591 A1 | 9/2009 | Langhorn | | |

\* cited by examiner

CHILD CAR SEAT FOOT REST DEVICE

The present invention relates to a foot-rest device intended to a child who is installed in a child seat placed on a seat or a bench seat of a vehicle, in particular a motor vehicle of the private car type or for public transport. It may however apply to other types of vehicles and, for example, an airplane.

The child seats, also called baby seats, or the seat reducers are security items that are important, or even mandatory, for the transport of children in motor vehicles. Indeed, the vehicle seats or bench seats of origin and their holding means such as security belts are not adapted to persons of small size, like children, and there exists a risk that the child is not held and is transformed into a projectile in case of accident. To avoid that, child seats adapted to the size of children are installed on and secured to the vehicle seats or bench seats. The children placed in such child seats may hence be perfectly held in their child seats during an accident.

However, the legs of the children hang free in front of the child seat, which may cause drawbacks. The blood or lymphatic circulation in the thighs may be hindered at the front of the child seat, where the tights rest. In case of accident, the legs that are not held may be thrown forward and hit elements of the vehicle passenger compartment.

The present invention proposes to remedy in particular to these drawbacks with a child foot-rest device that is removable and that is arranged in front of the child seat and secured thereto. This device, in addition to its securing to the child seat when installed, also rests on the floor of the vehicle passenger compartment. It also has other advantages that will appear at the reading of the present document.

It is known by the document US2006/0012243 a child seat support formed of a contoured extended plate of significant overall dimensions and weight. Other devices are also known in relation with vehicle seats by the documents US2009/224591 and FR2957564.

Hence, the invention relates to a foot-rest device for a child installed in a child seat secured to a seat or a bench seat of a vehicle passenger compartment. The term "child seat" is used generically to cover all security adapter or reducer seat for a child or a baby.

According to the invention, the device includes:
  an upright intended to be installed in a median vertical plane of the child seat,
  a rotation-proof bar transverse to the upright,
  a foot-rest bar transverse to the upright,
  a means for securing said device to the child seat,
the upright including at its lower end a foot intended to rest on the floor of the passenger compartment, the rotation-proof bar and the foot-rest bar being secured in their middles substantially perpendicular to said upright, so as to each form two lateral parts that are symmetrical with respect to said median plane, and the rotation-proof bar and the foot-rest bar are located in vertical planes that are offset relative to each other, the rotation-proof bar being set back from the foot-rest bar in the installed position of the device, with reference to the direction of forward travel of the vehicle.

In various embodiments of the invention, the following means are used, which can be used in isolation or according to any technically possible combination:
  the vehicle is a private or public transport motor vehicle, in particular a coach or a bus,
  the vehicle is an aircraft, in particular an airplane,
  the offset distance of the vertical planes passing through the rotation-proof bar and the foot-rest bar is adjustable, so as to adjust the anteroposterior spacing between the rotation-proof bar and the foot-rest bar,
  the height of the device between its highest point and its lowest point is adjustable,
  the height of the foot-rest bar with respect to the foot of the device is adjustable,
  the height of the foot-rest bar with respect to the rotation-proof bar is adjustable,
  the rotation-proof bar may bear against the front of the child seat,
  the rotation-proof bar may bear against the front of the sitting part of the vehicle seat or the vehicle bench seat,
  the rotation-proof bar may bear against the front of a seat or bench seat elevating base rising from the floor of the vehicle,
  the upright of the installed device is inclined in a front-rear vertical plane,
  the upright of the installed device is vertical,
  the upright has a substantially cylindrical cross-section,
  the upright has a substantially square cross-section,
  the upright has a substantially rectangular cross-section,
  the upright is hollow,
  the upright is solid,
  the distance/height between the foot and the rotation-proof bar is adjustable,
  the distance/height between the foot and the rotation-proof bar is fixed,
  the height of the upright is fixed,
  the height of the upright is adjustable,
  the height of the upright is adjustable, the upright being formed of two parts nesting into each other and able to slide relative to each other, a removable locking means between the two parts allowing to keep the chosen height,
  the distance between the foot and the lower end of the upright is fixed,
  the distance between the foot and the lower end of the upright is adjustable,
  the distance between the foot and the lower end of the upright is adjustable, the link between the foot and the upright being ensured by a threaded rod that can be more or less screwed into the lower end of the upright,
  the device includes at least one of the following adjustment means:
    a means for adjusting the anteroposterior spacing between the rotation-proof bar and the foot-rest bar,
    at least one means for adjusting the height of the device,
    a means for adjusting the height of the foot-rest bar along the device,
  the foot-rest bar is straight and is horizontal in the installed position of the device,
  the foot-rest bar has a substantially planar cross-section,
  the foot-rest bar of substantially planar cross-section is adjustable in inclination,
  the foot-rest bar has a substantially cylindrical cross-section,
  the foot-rest bar has a substantially square cross-section,
  the foot-rest bar has a substantially rectangular cross-section,
  the foot-rest bar is hollow,
  the foot-rest bar is solid,
  the foot-rest bar includes skid-proof pads,
  the rotation-proof bar is a single-piece element,
  the rotation-proof bar is straight and is horizontal in the installed position of the device,
  the rotation-proof bar is V-shaped,
  the V-shaped rotation-proof bar is a downwardly open V in the installed position of the device, the V-shaped rotation-proof bar is an upwardly open V in the installed position of the device, the rotation-proof bar is arranged at the upper end of the upright, the rotation-proof bar is arranged at the upper end of the upright so as to be able to bear against the front of the child seat, the rotation-proof bar is arranged at the upper end of the upright at the end of a rearward bend of the upper part of the upright, the highest point of the device is the rotation-proof bar, the rotation-proof bar is arranged toward the lower end of the upright, the means for securing said device to the child seat includes at least one strap, the means for securing said device to the child seat includes at least one strap, at least one part of the strap(s) of the securing means is intended to extend from the front to the rear along each side of the child seat, at least one part of the strap(s) of the securing means is intended to pass under the child seat by extending rearward in the installed position of the device, the means for securing said device to the child seat includes two lateral fastening means for the two lateral parts of the rotation-proof bar, the lateral fastening means for the two lateral parts of the rotation-proof bar include/implement complementary loop and hook strips, of the VELCRO® type, or equivalent, arranged on the rotation-proof bar or on the front of the child seat, respectively, the two lateral fastening means include lateral strap parts integral with the rotation-proof bar and intended to extend from the front to the rear along each side of the child seat, the lateral strap parts integral with the rotation-proof bar include/implement complementary loop and hook strips, of the VELCRO® type, or equivalent, arranged on the lateral straps and the lateral sides of the child seat, respectively, the securing means further includes a locking means intended to bear against the rear of the child seat and/or to be wedged between the vehicle seat or the vehicle bench seat and the child seat in an area of connection between a sitting part and a back part of said vehicle seat or said vehicle bench seat, the rear ends of the lateral straps being connected to the locking means, the means for securing said device of the child seat includes a strap-based median fastening means integral with the upright and intended to pass under the child seat by extending rearward in the installed position of the device, the strap-based median fastening means includes/implements complementary loop and hook strips, of the VELCRO® type, or equivalent, arranged on the lateral straps and on the underside and/or the rear of the child seat, respectively, the securing means includes a locking means intended to bear against the rear of the child seat and/or to be wedged between the vehicle seat or the vehicle bench seat and the child seat in an area of connection between a sitting part and a back part of said vehicle seat or said vehicle bench seat, the rear ends of the lateral straps and/or the rear end of the strap of the median fastening means being connected to the locking means, the lengths of the straps are adjustable in order to immobilize by tightening the device against the front of the child seat, the straps of the two lateral fastening means and the strap of the median fastening means are a single and same unique strap of adjustable length allowing to tighten at once the two lateral fastening means and the median fastening means, said unique strap forming a circular loop about the child seat with a round-trip return under the child seat between the locking means and the upright, the strap return under the child seat between the locking means and the upright is median, the strap return under the child seat between the locking means and the upright has the shape of a backwardly open V, the straps of the two lateral fastening means are a single and same unique strap of adjustable length allowing to tighten at once the two lateral fastening means, said unique strap forming a circular loop around the child seat, the strap of the median fastening means being independent of the others and its length being independently adjustable, the strap(s) pass through sleeves, the complementary loop and hook strips, of the VELCRO® type, or equivalent, are for a part located on the sleeves, at least one part of the strap of the median fastening means extended between the locking means and the upright is passed in a common central sleeve, the locking means is a bar, the bar of the locking means has a substantially planar cross-section, the bar of the locking means has a substantially open V-shaped cross-section, the bar of the locking means has a substantially cylindrical cross-section, the bar of the locking means has a substantially square cross-section, the bar of the locking means has a substantially rectangular cross-section, the bar of the locking means is hollow, the bar of the locking means is solid, the bar of the locking means includes/implements complementary loop and hook strips, of the VELCRO® type, or equivalent, arranged on said bar of the locking means and on the underside and/or the rear of the child seat, respectively, the bar of the locking means includes skid-proof pads, the complementary loop and hook strip(s), of the VELCRO® type, or equivalent, arranged on the child seat are added elements, fixed by adhesive, the device being provided with corresponding strips to be stuck on the child seat, the locking means and the rotation-proof bar are hollow and the respective strap(s) pass inside at least one part of the locking means and of the rotation-proof bar, the foot is articulated at the lower end of the upright, said articulation being preferably a spherical articulation, the foot has a base resting on the floor, of circular shape, the foot has a base resting on the floor, of oval shape, the foot has a base resting on the floor, of square or rectangular shape, the lower face of the foot intended to rest on the floor of the passenger compartment is skid-proof, the lower face of the foot intended to rest on the floor of the passenger compartment is skid-proof, said lower face including notches intended to come into engagement with a floor coating of the passenger compartment, the lower face of the foot intended to rest on the floor of the passenger compartment is skid-proof, said lower face including a skid-proof coating, the rotation-proof bar, the foot-rest bar, the upright and the bar of the locking means have a circular cross-section, the device includes metal parts, the device includes aluminum parts, the device includes plastic material parts, the hollow plastic material parts of the device are transparent so as to be able to see the inside of said hollow tubular parts, the upper end of the upright includes a means for hooking a game or utility accessory for the child, the game accessory is for example a steering wheel mounted on a rod, the rod including an elastic means, in particular a spring, allowing the retraction of said steering wheel upon a thrust on the steering wheel higher than a thrust threshold, the utility accessory is a support, in particular for a baby bottle or a video screen, the device further includes a securing accessory including a main bar intended to extend forward and an arm intended to extend upward, the arm being articulated by an articulation to the main bar for the adjustment of its inclination, a first end of the main bar includes a releasable tightening and securing jaw and a second end, opposite to the first one, includes a means for the securing to the upright of the foot-rest device, the second end of the main bar is fixed articulated to the lower end of the upright, the two opposite ends of the main bar include releasable tightening and securing jaws, the free end of the arm also includes a releasable tightening and securing jaw, The present invention will now be exemplified, without being limited thereby, by the following description of embodiments and implementations in relation with:

FIG. 1, which is a perspective view of a first exemplary embodiment of the not-installed device, FIG. 2, which is a lateral view of the installed device, FIGS. 3 and 4, which are two perspective views of a second exemplary embodiment, and FIG. 5, which is a perspective view of a securing accessory for the foot-rest device of the invention in the case of an implementation on a passenger seat of an airplane.

Figures 1, 2:
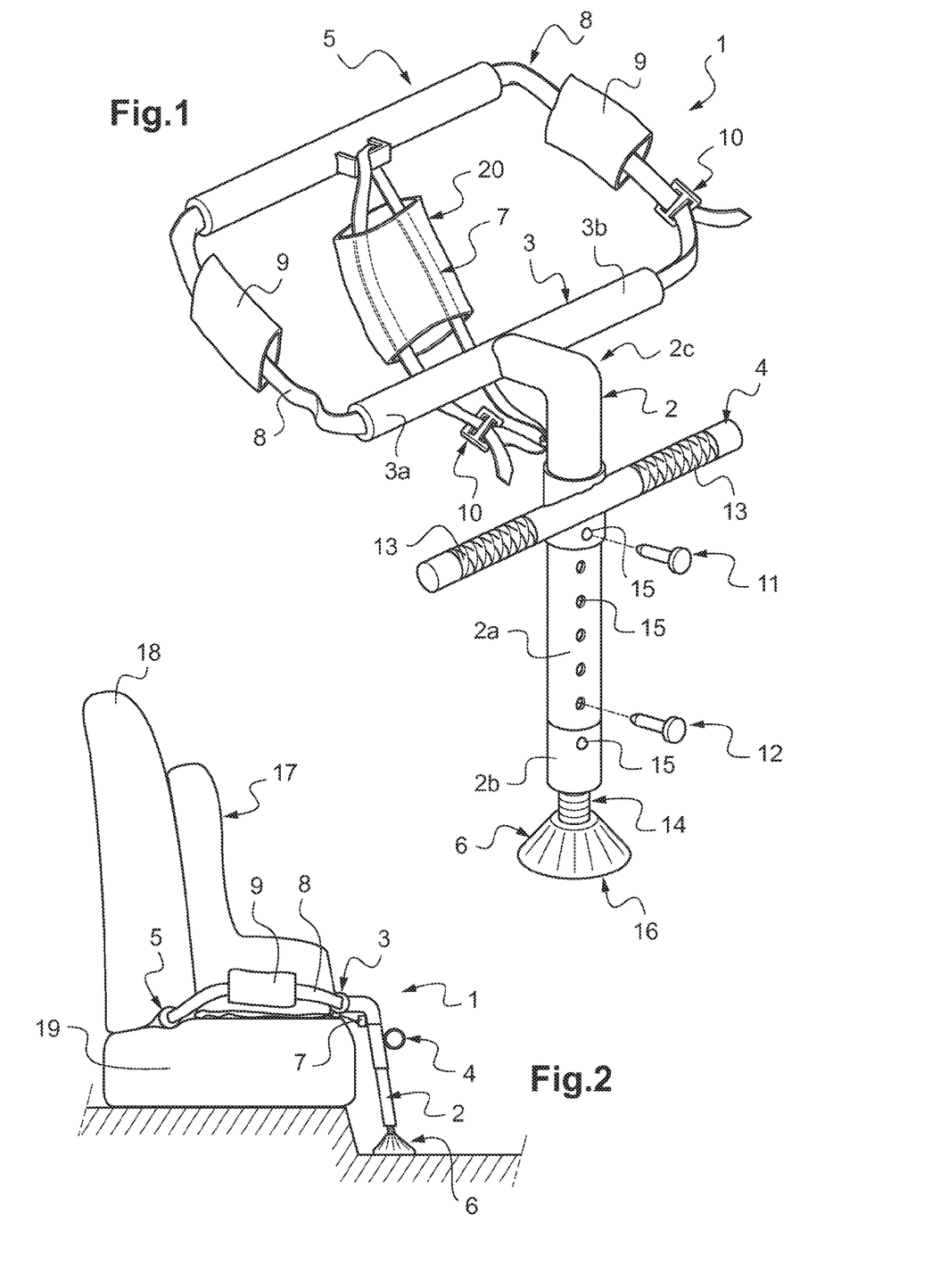

The foot-rest device 1 includes a median upright 2 intended to be installed in a vertical plane, a rotation-proof bar 3 intended, in this example, to bear against the front of the bottom part of the child seat (not shown), includes a foot-rest bar 4 on which the child installed in the child seat can place the feet, includes a means for securing said device to the child seat that will be detailed hereinafter and includes a foot 6 intended to rest on the floor of the vehicle passenger compartment.

The rotation-proof bar 3 is herein arranged at the upper end of the upright 2, on the rear of a bend 2c of said upright 2. In FIG. 1, the bend 2c forms an angle of substantially 90° with respect to the main axis of the upright 2 but it is understood that, in other embodiments, the angle of the bend may be more or less open and, for example of 45°, or even less.

The foot-rest bar 4 is adjustable in height along the upright 2 by sliding and immobilization by an immobilization means that includes in this example through-orifices 15 matched together and in which a stud or a pin 11, preferably removable, is inserted. It is understood that any other adjustment and immobilization means can be used to obtain this adjustment in height and the immobilization of the foot-rest bar along the upright, and for example a rack or latch system, a tightening system, push-button, screw+bolt . . . .

In this exemplary embodiment, two means for adjusting the whole height of the device are also provided. A first one allowing to adjust the distance between the foot 6 and the lower end of the upright 2, such as a threaded rod 14 more or less screwed into the lower end of the upright 2. A second one allowing to telescopically adjust the length of the upright 2, by nesting and sliding of a lower part 2b into an upper part 2a of said upright 2 and immobilization thanks to an immobilization means of the same type as that of the foot-rest bar 4, i.e. through-orifices 15 and a stud or a pin 12, preferably removable. It is understood that any other means for adjusting the length of the upright can be used and that, in other embodiments, the first and/or second means for adjusting the whole height of the device can be omitted.

In another embodiment, not shown, the means for adjusting the height of the foot-rest bar 4 and the means for adjusting the length of the upright 2 are combined together and the adjustment of the height of the foot-rest bar modifies the height of the upright. The foot-rest bar includes skid-proof sleeves 13 at the place where the feet of the child will rest.

The foot 6 is articulated through a spherical joint so that, in case of installation of the device with an inclined upright, the lower face 16 of the foot is horizontal and suitably applied flat on the floor of the vehicle passenger compartment. The lower face 16 of the foot includes a skid-proof coating, for example notches that will engage with the possibly looped carpet, which is generally found on the floor of the vehicle passenger compartments. It is understood that there may be an interest in that the upright 2 is inclined from the bottom and the front to the top and the rear during the installation so as to form a kind of stiffener coming in rest against the front of the child seat and improving the holding of the child seat on the vehicle seat or bench seat in case of shock.

In a not-shown variant, a means is provided to adjust the anteroposterior distance between the rotation-proof bar 3 and the foot-rest bar 4. It may for example be used a means for adjusting the length of the rear part of the bend 2c of the same type as that of the second means for adjusting the length of the upright 2 with nesting and sliding of two parts of the upright.

The foot-rest bar 4 and the rotation-proof bar 3 are secured in their middles to the upright 2, so as to form a device substantially symmetrical with respect to this upright. In this example, the foot-rest bar 4 and the rotation-proof bar 3 are straights. In a variant, a rotation-proof bar is provided, which has the shape of a downwardly open V, for an inclined and no longer straight rest against the front of the child seat.

The means for securing the device to the child seat includes two main parts: two lateral fastening means and one strap-based median fastening means 7. The two lateral fastening means include parts of lateral straps 8 integral with at least the two ends of the rotation-proof bar 3 and intended to extend from the front to the rear along each side of the child seat. In order to improve the lateral holding of the lateral straps, sleeves 9 are installed on the straps in order to increase the surface of contact with the two lateral sides of the child seat. The sleeves are preferably flat but, in a variant (not shown), the sleeves have a L shape, with the bottom part of the L taken, wedged, under the child seat. It is also possible to implement complementary loop and hook strips, of the VELCRO® type, or equivalent, arranged on said sleeves 9 and on the side and, possibly if L-shaped, the underside of the child seat, respectively.

The strap-based median fastening means is, on the front, integral with the upright and intended to pass under the child seat toward the rear of the latter. In order to improve the holding of the straps 7 and 8 against the back of the child seat and/or to wedge them between the vehicle seat or the vehicle bench seat and the child seat in an area of connection between a sitting part and a back part of said vehicle seat or said vehicle bench seat, the straps are connected to a locking means 5. This locking means is herein a hollow tube. In other embodiments, the locking means may be a planar or V-shaped plate bearing against the rear of the child seat or slipped in the area of connection between the sitting part and the back part of the vehicle seat or bench seat. It is understood that any means for holding the straps on this locking means may be used and adapted.

In this example, a single strap 8 arranged into a loop forms the two lateral fastening means and this strap 8 passes on the front inside the rotation-proof bar 3, which is hollow, and passes on the rear inside the blocking means 5. The straps 7 and 8 include tightening means 10, allowing to tighten them, during the installation of the device, or to loosen them, during the dismounting thereof. Here again, any strap tightening means can be used.

A part of the strap 7 of the median fastening means extending between the locking means 5 and the upright 2 is passed inside a common central sleeve 20 that, in this example, is transparent. The means for fastening the strap 7 to the locking means 5 and to the upright 2 are horizontal so that the strap 7 is also substantially horizontal.

In variants in which it is desired to improve the holding of the straps on the child seat, it is provided to use complementary loop and hook strips, of the VELCRO® type, arranged on the straps 7, 8 and/or sleeves 9 and the corresponding parts of the child seat, respectively. It is to be noted that certain vehicles use looped fabric coatings and can be used to strengthen the tightening and holding of the device with a hook strip on certain elements of the device.

Preferably, the elements implemented in the device, in particular those which can come into contact with the child, in particular the upright 2, the foot-rest bar 4 and the rotation-proof bar 3 do not have any sharp edge or protruding part and are preferably tubular with circular cross-sections. They may be covered with a shock-absorber coating, of the closed- or open-cell foam type, which may also play a skid-proof role. These elements are preferably made of a plastic material. In the case where a use in an airplane is contemplated, there may be an interest in that the hollow parts are transparent so that the inside thereof can be seen for the security controls.

In FIG. 2, the device 1 of FIG. 1 has been installed against a child seat 17 that has been fixed on a vehicle seat or bench seat. The vehicle seat or the vehicle bench seat includes a sitting part 19 and a back part 18. The rotation-proof bar 3 is placed in rest against the front and toward the bottom of the child seat 17 so that the upright 2 is substantially in the middle, between the two legs of the child (not shown). The upright 2 is inclined in a vertical plane from the top and rear to the bottom and front, where it rests on the floor of the vehicle passenger compartment through the spherical-articulation foot 6. The foot-rest bar 4 has been positioned in height to be adapted to the child and to the installation in the vehicle. In an evolved embodiment in which the total height of the device can be adjusted, the latter will have been adjusted to be adapted to the installation in the vehicle. It may be noted that, in the absence of such a height adjustment means, or if it is not sufficient, a compensation can be obtained, in certain limits, by inclining more or less the upright 2.

The device is locked against the child seat 17 thanks to the tightening of the two lateral fastening means with their lateral strap parts 8 and of the strap-based median fastening means 7. The sleeves 9 allow to hold the lateral strap parts 8 on the sides of the child seat, even after tightening of the straps. The hollow tube of the locking means 5 is wedged at the rear of the child seat 17.

On the lateral view of FIG. 2, it can be seen that it would be conceivable, in other embodiments and/or installations, that the rotation-proof bar 3 or an additional rotation-proof bar bears against the front of the sitting part 19 or lower on the elevating base of the seat or of the bench seat rising from the vehicle floor. In these embodiments, it is contemplated to adapt the positioning of the means for securing the device to the child seat, in particular in the case of straps. In variants, it may be implemented a means for securing the device to the vehicle seat or to the bench seat alone or as a complement of the securing to the child seat. Other means for securing the device to the child seat than those already presented may be implemented, as for example a plate integral with the rotation-proof bar and that comes and wedges under the child seat and that may possibly partially go up at the rear of the child seat. In other cases, the straps for securing the child seat to the vehicle seat or the vehicle bench seat may be used to secure the device thereto. Generally, it is preferable that the device is integral with the child seat and is directly secured thereto.

Figures 3, 5:
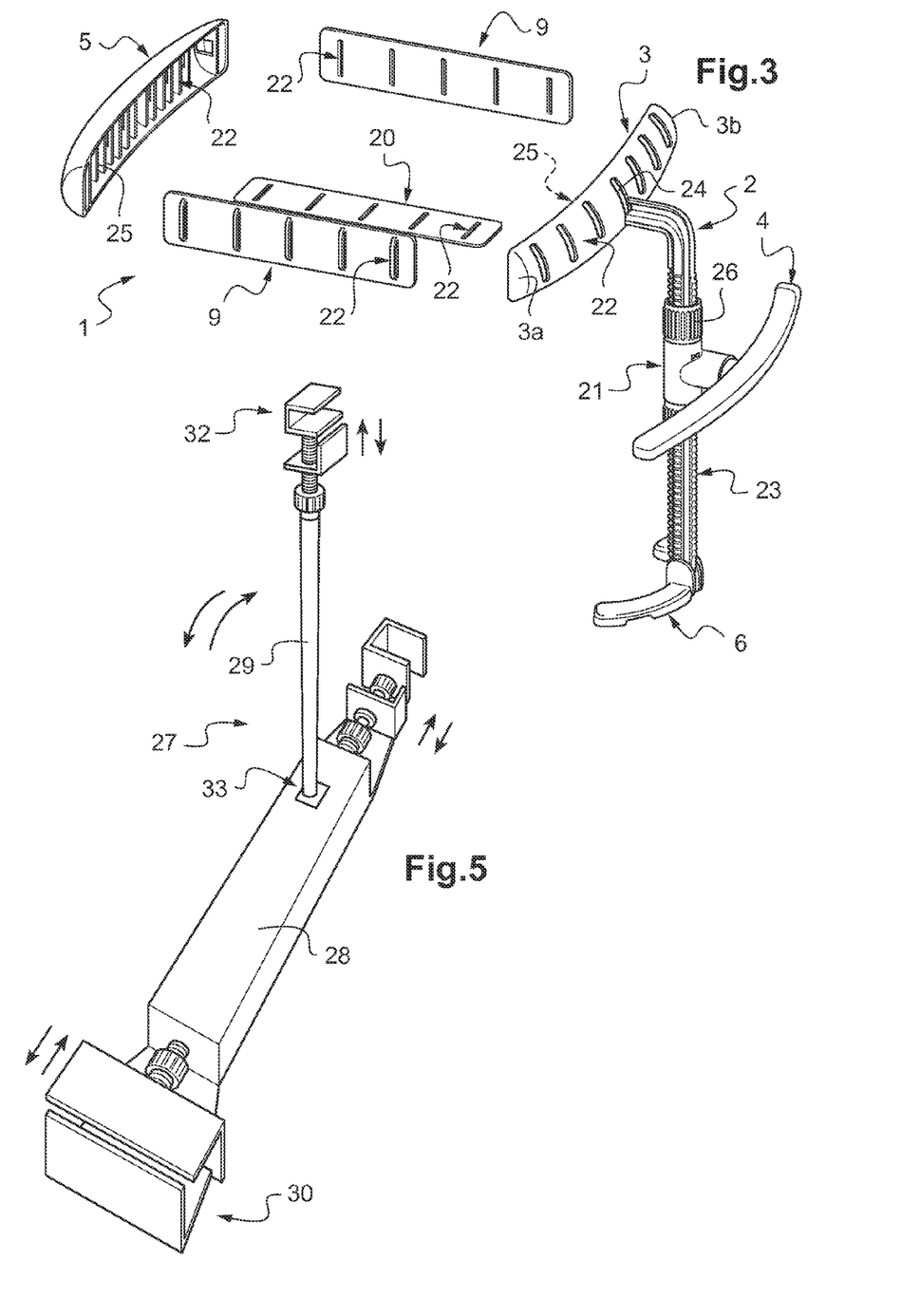
Figure 4:
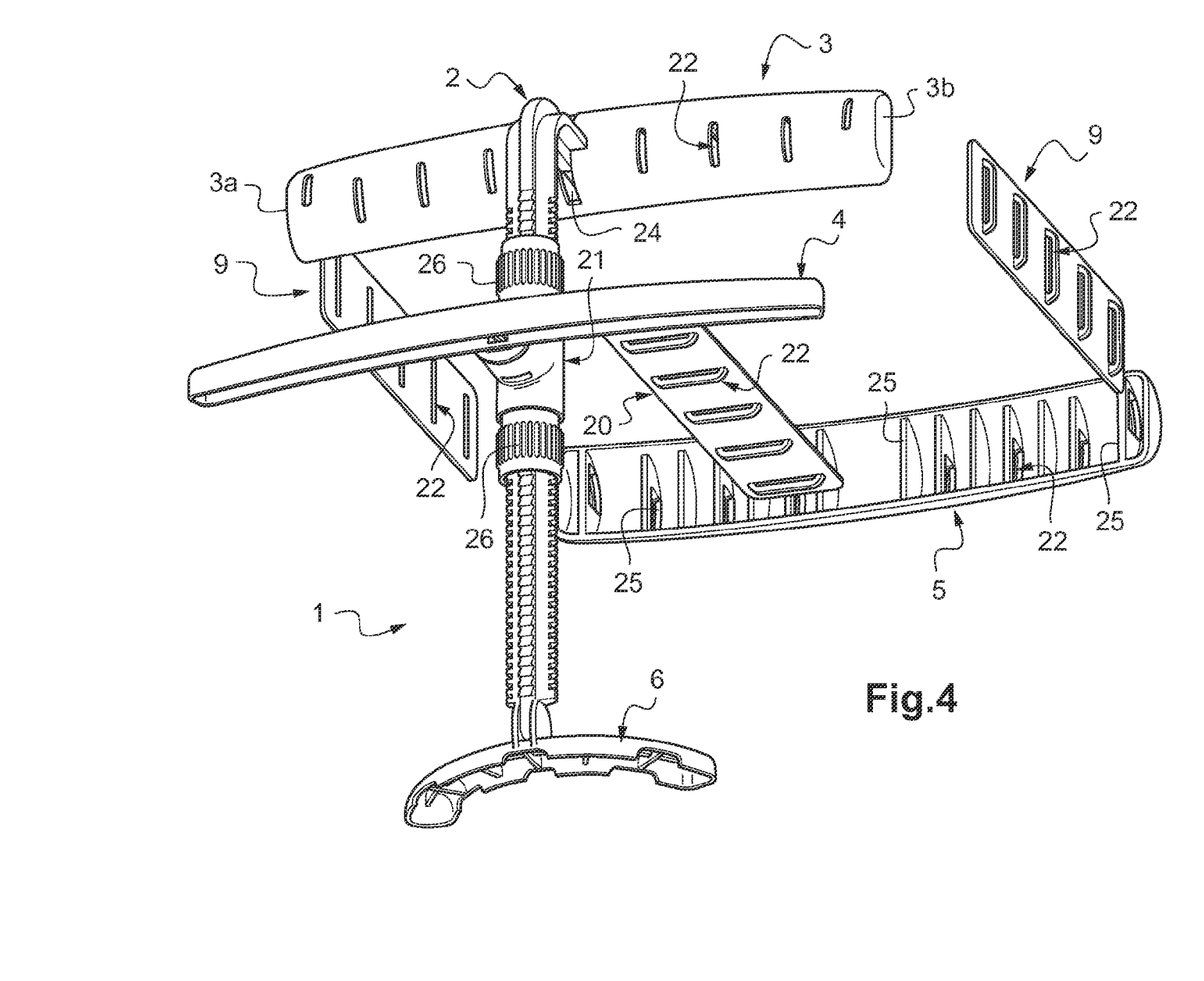

In the second exemplary embodiment, as shown in FIGS. 3 and 4, the foot-rest device 1 also includes a median upright 2, a rotation-proof bar 3, a foot-rest bar 4, a foot 6 and means for securing the device to the child seat that are a locking bar 5 and two lateral fastening means and a median fastening mean whose respective straps have not been shown in these Figures, for the sake of simplification.

The rotation-proof 3, herein curved, as an arc of a circle, is arranged, articulated 24, at the upper end of the upright 2 at the rear of the bend of said upright 2. The articulation 24 of the upper end of the upright 2 to the rotation-proof bar 3 is of the type rotating about a substantially horizontal axis to tilt the rotation-proof bar as a function of the inclination of the front of the bottom part of the child seat (not shown) on which it bears.

The foot-rest bar 4 is adjustable in height along the upright 2, notched 23, by sliding and immobilization of a T-shaped connection means 21. The notching 23 is preferably arranged in spiral as a screw thread and the sliding connection means is released or locked by rotation/screwing-unscrewing of two nuts 26. Furthermore, the cross-sectional shape of the upright is such that a rotation of the connection means 21 of the foot-rest bar about the axis of the upright 2 is impossible. This cross-sectional shape is herein cross-shaped or X-shaped, and the connection means 21 has a passage of inner shape complementary of that of the upright, wherein the upright passes through the passage. The connection means 21 and the two nuts 26 have functions similar to those of the immobilization means of the first exemplary embodiment. The foot-rest bar 4 fixed on the connection means 21 has a contoured, arc-of-a-circle, shape.

The foot 6 is articulated in rotation at the lower end of the upright 2 about a substantially horizontal axis. The foot 6 has a contoured, arc-of-a-circle, shape.

As above, the two lateral fastening means include lateral strap parts (not shown) integral, on the front, with the rotation-proof bar 3 and, on the rear, with a locking bar 5. Those lateral strap parts are intended to extend from the front to the rear along each side of the child seat by being passed in lateral sleeves 9, which are herein elongated plates including loops 22. The lateral sleeves 9 include loops 22 in which the straps are passed and that allow to make the sleeves integral with the straps. The plates of the lateral sleeves are relatively rigid while being flexible/elastic enough to be adapted to the general shape of each side of the child seat, which is not necessarily straight/planar but may be contoured.

Likewise, the strap-based median fastening means (not shown) includes a central sleeve 20 with loops 22. The plate of the central sleeve 20 is relatively rigid while being flexible/elastic enough to be adapted to the general combined shape of the underside of the child seat and of the topside of the vehicle seat, a general shape that is not necessarily straight/planar but that may be contoured. The strap of the median fastening means is herein integral, on the front, with the rotation-proof bar 3 and, on the rear, with the locking bar 5.

The rotation-proof bar 3 and the locking bar 5 both include loops 22 intended to make the straps integral with these two bars. In the embodiment shown, the straps pass alternatively from the front face to the rear face of the rotation-proof bar 3 or of the locking bar 5 through the loops 22, but in other embodiments, the straps may remain hidden, the loops being made through ribs 25 on the non-visible side of said bars 3, 5, such ribs 25 being shown in FIGS. 3 and 4. In a simplified variant, the rotation-proof bar 3 and the locking bar 5 are identical, which simplifies the manufacturing of the elements of the device and only the bar that will be placed on the front, i.e. the rotation-proof bar 3, will receive the upper end of the upright 2, to then form the articulation 24. The elements of the device shown in FIGS. 3 and 4 are essentially made of plastic material(s) by molding and/or by extrusion.

In case of use of the device on a passenger seat of an airplane, it is possible, if a reinforced securing of the device to the seat is desired, in complement or not of the straps, to implement the securing accessory 27 shown in FIG. 5. The foot-rest device may be used with a child/baby seat installed on the airplane passenger seat or with no child/baby seat installed. In this latter case, the rotation-proof bar is applied against the front of the sitting part of the airplane passenger seat and the straps of the device may be not used or be used only in part.

This securing accessory 27 includes a main bar 28 intended to extend substantially horizontally toward the front of the bottom of the airplane passenger seat and an arm 29 intended to extend upward. The arm 29 is articulated through an articulation 33 to the main bar 28 to adjust the inclination thereof with respect to the main bar. The end 30 of the main bar 28 includes a jaw for the releasable tightening and securing to the horizontal bar that is found under the airplane passenger seats. The end 31, opposite to the previous one 30, of the main bar 28 includes a jaw for the releasable tightening and securing of the upright 2 of the foot-rest device of the invention. The free/upper end 32 of the arm 29 includes a jaw for the releasable tightening and securing to the substantially horizontal part, on the rear of the bend 2c, of the upright 2 of the foot-rest device of the invention. The jaws at the ends 30, 32 and 32 are also adjustable in translation to adjust the lengths of the main bar 28 and of the arm 32. Preferably, the jaw translation adjustment means are of the type of those used to adjust in height the foot-rest bar 4 with a notching 23, nuts 26 and a cross-section or X-section.

In a variant, the end 31 of the main bar 28 includes a means for the securing to the lower end of the upright 2, in replacement or not of the foot 6 of the foot-rest device 1. In another variant, the end 31 of the main bar 28 includes a securing means articulated to the lower end of the upright 2 and the main bar 28 may be applied against the upright 2, the arm 29 being tilted against the main bar 28 so as to retract against the upright 2 said accessory 27 when the latter is not used for the securing thereof to an airplane passenger seat. Hence, the accessory 27 may remain integral with the foot-rest device even if the latter is finally used only occasionally during trips by airplane between usual trips by car.

Of course, the present invention is not limited to the particular embodiments that have just been described, but extends to any variants and equivalents in accordance with the spirit of the invention. Hence, it will be understood that the invention may be declined according to many other possibilities without departing thereby from the scope defined by the description and the claims. For example, it may be provided a means for securing accessories, games or utilities on one or several elements of the device.

The invention claimed is:

1. A foot-rest device (1) for use by a child sitting in a child seat (17) secured on a seat or bench seat (18, 19) of a passenger compartment of a vehicle, said foot-rest device (1) including:

an upright (2) intended to be installed in a median vertical plane of the child seat (17),
a rotation-proof bar (3) transverse to the upright (2),
a foot-rest bar (4) transverse to the upright (2),
a securing system (5, 7, 8, 9, 10) intended for securing said device to the child seat,
a lower end of the upright (2) including a foot (6) intended to rest on a floor of the passenger compartment,
the rotation-proof bar and the foot-rest bar (4) each having a middle secured substantially perpendicular to said upright to each form two lateral parts symmetrical with respect to said median plane,
wherein the rotation-proof bar (3) is arranged at an upper end of the upright (2) so as to be able to bear against a front of the child seat (17) or against a front of a sitting part (19) of said vehicle seat, and the rotation-proof bar and the foot-rest bar are in vertical planes that are offset relative to each other, the rotation-proof bar being set back from the foot-rest bar in an installed position of the device, with reference to a direction of forward travel of the vehicle,
wherein the securing system includes two lateral fastening elements for the two lateral parts (3a, 3b) of the rotation-proof bar (3), the two lateral fastening elements including lateral strap parts (8) integral with the rotation-proof bar (3) and intended to extend from the front to a rear along each side of the child seat,
wherein the securing system includes a strap-based median fastening element (7) integral with the upright (2) and intended to pass under the child seat by extending rearward in the installed position of the device,
wherein the securing system includes a locking bar (5) intended to bear against the rear of the child seat (17) or intended to be wedged between the vehicle seat or the vehicle bench seat and the child seat in an area of connection between a sitting part (19) and a back part (18) of said vehicle seat or said vehicle bench seat, rear ends of the lateral straps (8) and a rear end of the strap of the median fastening element (7) being connected to the locking bar (5), and
wherein the securing system is selected from the group consisting of
i) a system in which the straps of the two lateral fastening elements (8) and the strap of the median fastening element (7) are a single and same unique strap of adjustable length allowing to tighten at once the two lateral fastening elements and the median fastening element, said unique strap forming a circular loop about the child seat with a round-trip return under the child seat between the locking bar (5) and the upright (2), and ii) a system in which the straps of the two lateral fastening elements (8) are a single and same unique strap of adjustable length allowing to tighten at once the two lateral fastening elements, said unique strap forming a circular loop about the child seat, the strap of the median fastening element (7) being independent of the others and having a length that is independently adjustable.

2. The foot-rest device according to claim 1, further including at least one of following adjustment systems:
   a spacing adjustment system for adjusting the anteroposterior spacing between the rotation-proof bar (3) and the foot-rest bar (4),
   at least one device height adjustment system for adjusting the height of the device,
   a foot-rest bar height adjustment system for adjusting the height of the foot-rest bar (4) along the device.

3. The foot-rest device according to claim 1, wherein the securing system wherein the securing system is the system in which the straps of the two lateral fastening elements (8) and the strap of the median fastening element (7) are a single and same unique strap of adjustable length allowing to tighten at once the two lateral fastening elements and the median fastening element, said unique strap forming the circular loop about the child seat with a round-trip return under the child seat between the locking bar (5) and the upright (2).

4. The foot-rest device according to claim 1, wherein the securing system is the system in which the straps of the two lateral fastening elements (8) are the single and same unique strap of adjustable length allowing to tighten at once the two lateral fastening elements, said unique strap forming the circular loop about the child seat, the strap of the median fastening element (7) being independent of the others and having the length that is independently adjustable.

5. The foot-rest device according to claim 1, wherein at least one of the straps pass through sleeves (9).

6. The foot-rest device according to claim 1, wherein the locking bar (5) and the rotation-proof bar (3) are hollow and each strap passes inside at least one part of the locking bar and of the rotation-proof bar.

7. The foot-rest device according to claim 1, wherein the foot (6) is articulated with an articulation at the lower end of the upright, said articulation being a spherical articulation.

8. The foot-rest device according to claim 1, wherein the foot has a base resting on the floor, of a shape chosen among at least one of the following shapes: circular, oval, square or rectangular.

9. The foot-rest device according to claim 1, wherein the rotation-proof bar, the foot-rest bar, the upright and the locking bar each have a circular cross-section.

10. The foot-rest device according to claim 1 in combination with a securing accessory (27), the securing accessory including a main bar (28) intended to extend toward the front and an arm (29) intended to extend upward, the arm (29) being articulated by an articulation element (33) to the main bar (28) for inclination adjustment, and a first end (30) of the main bar (28) includes a releasable tightening and securing jaw and a second end (31), opposite to the first one, includes a securing means for the securing to the upright (2) of the foot-rest device, and the free end (32) of the arm (29) also includes a releasable tightening and securing jaw.

11. The foot-rest device according to claim 1, wherein the foot (6) is articulated with an articulation at the lower end of the upright.

12. A foot-rest device (1) for use with a child seat (17), said foot-rest device comprising:
   an upright (2) that installs in a vertical, median plane, the upright (2) having a lower end that rests on a floor of a passenger compartment of a vehicle;
   a rotation-proof bar (3) located transverse to the upright (2) and arranged at an upper end of the upright (2);
   a foot-rest bar (4) located transverse to the upright (2),
   wherein the rotation-proof bar and the foot-rest bar (4) each have a middle secured substantially perpendicular to said upright to each form two lateral parts symmetrical with respect to said median plane, and the rotation-proof bar and the foot-rest bar are in vertical planes that are offset relative to each other, the rotation-proof bar being set back from the foot-rest bar;
   a securing system (5, 7, 8, 9, 10) that secures said device to the child seat,
   wherein the securing system includes
   i) two lateral fastening elements for the two lateral parts (3a, 3b) of the rotation-proof bar (3), the two lateral fastening elements including lateral strap parts (8) integral with the rotation-proof bar (3) and extending from a front to a rear of the child seat,
   ii) a strap-based median fastening element (7) integral with the upright (2) and configured to extend rearward in an installed position of the device, and
   iii) a locking bar (5), with rear ends of the lateral straps (8) and a rear end of the strap of the median fastening element (7) being connected to the locking bar (5); and
   wherein the straps of the two lateral fastening elements (8) and the strap of the median fastening element (7) are a single and same unique strap of adjustable length allowing to tighten at once the two lateral fastening elements and the median fastening element, said unique strap forming a circular loop about the child seat with a round-trip return under the child seat between the locking bar (5) and the upright (2).

13. A foot-rest device (1) for use with a child seat (17), said foot-rest device comprising:
   an upright (2) that installs in a vertical, median plane, the upright (2) having a lower end that rests on a floor of a passenger compartment of a vehicle;
   a rotation-proof bar (3) located transverse to the upright (2) and arranged at an upper end of the upright (2);
   a foot-rest bar (4) located transverse to the upright (2),
   wherein the rotation-proof bar and the foot-rest bar (4) each have a middle secured substantially perpendicular to said upright to each form two lateral parts symmetrical with respect to said median plane, and the rotation-proof bar and the foot-rest bar are in vertical planes that are offset relative to each other, the rotation-proof bar being set back from the foot-rest bar in an installed position of the device, with reference to a direction of forward travel of the vehicle;
   a securing system (5, 7, 8, 9, 10) that secures said device to the child seat,
   wherein the securing system includes two lateral fastening elements for the two lateral parts (3a, 3b) of the rotation-proof bar (3),
   wherein the two lateral fastening elements include lateral strap parts (8) integral with the rotation-proof bar (3) and extend from a front to a rear along each side of the child seat,
   wherein the securing system includes
   i) a strap-based median fastening element (7) integral with the upright (2) and configured to extend rearward in the installed position of the device, ii) a locking bar (5) with rear ends of the lateral straps (8) and a rear end of the strap of the median fastening element (7) being connected to the locking bar (5); and wherein the straps of the two lateral fastening elements (8) are a single and same unique strap of adjustable length allowing to tighten at once the two lateral fastening elements, said unique strap forming a circular loop about the child seat, the strap of the median fastening element (7) being independent of the others and having an independently adjustable length.

\* \* \* \* \*